United States Patent
Li

(10) Patent No.: US 9,366,402 B2
(45) Date of Patent: *Jun. 14, 2016

(54) ELECTRONIC LIGHTING DEVICE AND METHOD FOR MANUFACTURING SAME

(71) Applicant: Shenzhen Liown Electronics Company Ltd., Shenzhen (CN)

(72) Inventor: Xiaofeng Li, Shenzhen (CN)

(73) Assignee: SHENZHEN LIOWN ELECTRONICS COMPANY LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,507

(22) Filed: Jan. 2, 2015

(65) Prior Publication Data

US 2015/0109786 A1 Apr. 23, 2015

Related U.S. Application Data

(63) Continuation of application No. 14/161,143, filed on Jan. 22, 2014, now Pat. No. 8,926,137, which is a continuation of application No. 13/325,754, filed on Dec. 14, 2011, now Pat. No. 8,789,986, which is a continuation-in-part of application No. PCT/CN2011/076449, filed on Jun. 27, 2011.

(30) Foreign Application Priority Data

Jun. 28, 2010 (CN) .......................... 2010 1 0211402

(51) Int. Cl.
*F21S 10/04* (2006.01)
*F21S 6/00* (2006.01)

(Continued)

(52) U.S. Cl.
CPC ............. *F21S 10/043* (2013.01); *F21K 9/00* (2013.01); *F21S 6/001* (2013.01); *F21S 9/02* (2013.01);

(Continued)

(58) Field of Classification Search
USPC .................. 362/249.02, 277, 296.01, 810
See application file for complete search history.

(56) References Cited

U.S. PATENT DOCUMENTS

| 782,156 A | 2/1905 | Meeker |
| 817,772 A | 4/1906 | Helmer |

(Continued)

FOREIGN PATENT DOCUMENTS

| CN | 1030823 | 2/1989 |
| CN | 2551859 | 5/2003 |

(Continued)

OTHER PUBLICATIONS

U.S. Appl. No. 61/101,611, Sep. 30, 2008, Schnuckle.

(Continued)

*Primary Examiner* — Laura Tso
(74) *Attorney, Agent, or Firm* — Perkins Coie LLP

(57) ABSTRACT

An electronic lighting device may comprise an enclosure, a flame component, and an electrically powered driving mechanism. The flame component may be movably supported or suspended on the enclosure, and may comprise a first portion which is of a flame-like shape. The first portion may be exposed above the top of the enclosure. Light from a light-emitting element may intersect with the surface of the first portion so that the light projects onto the surface of the first portion. The electrically powered driving mechanism may be disposed adjacent the flame component and can apply a force on the flame component to actuate the flame component to sway or swing. By the present application, a visual experience of true fire can be achieved and an interestedness and appreciation can be improved.

15 Claims, 7 Drawing Sheets

(51) Int. Cl.
*F21K 99/00* (2016.01)
*F21S 9/02* (2006.01)
*F21V 23/00* (2015.01)
*F21V 23/04* (2006.01)
*F21W 121/00* (2006.01)
*F21Y 101/02* (2006.01)

(52) U.S. Cl.
CPC .............. *F21S 10/04* (2013.01); *F21S 10/046* (2013.01); *F21V 23/001* (2013.01); *F21V 23/0407* (2013.01); *F21W 2121/00* (2013.01); *F21Y 2101/02* (2013.01); *Y10S 362/81* (2013.01); *Y10T 29/4902* (2015.01); *Y10T 29/49002* (2015.01)

(56) References Cited

U.S. PATENT DOCUMENTS

| | | | |
|---|---|---|---|
| 1,507,371 A | 8/1924 | Goodridge | |
| 1,842,167 A | 1/1932 | Hall | |
| 1,955,042 A | 4/1934 | Work | |
| D102,561 S | 12/1936 | Lamb | |
| 2,435,811 A | 2/1948 | Waters | |
| 2,976,450 A | 3/1961 | Benoliel | |
| 2,984,032 A | 5/1961 | Cornell | |
| 3,233,093 A | 2/1966 | Gerlat | |
| 3,384,774 A | 5/1968 | English | |
| 3,425,157 A | 2/1969 | Hartsock | |
| 3,514,660 A | 5/1970 | Kopelman | |
| 3,603,013 A | 9/1971 | Gardiner | |
| 3,639,749 A | 2/1972 | Beckman | |
| 3,681,588 A | 8/1972 | Lee | |
| 3,814,973 A | 6/1974 | Thouret et al. | |
| 3,890,085 A | 6/1975 | Andeweg | |
| 4,026,544 A | 5/1977 | Plambeck et al. | |
| 4,328,534 A | 5/1982 | Abe | |
| 4,477,249 A | 10/1984 | Ruzek et al. | |
| 4,550,363 A | 10/1985 | Sandell | |
| 4,551,794 A | 11/1985 | Sandell | |
| 4,617,614 A | 10/1986 | Lederer | |
| 4,777,571 A | 10/1988 | Morgan | |
| 4,866,580 A | 9/1989 | Blackerby | |
| 4,965,707 A | 10/1990 | Butterfield | |
| 5,097,180 A | 3/1992 | Ignon et al. | |
| 5,381,325 A | 1/1995 | Messana | |
| 5,707,282 A | 1/1998 | Clements et al. | |
| 5,924,784 A | 7/1999 | Chliwnyj et al. | |
| 6,198,229 B1 | 3/2001 | McCloud et al. | |
| 6,257,755 B1 | 7/2001 | Sevelle | |
| 6,302,555 B1 | 10/2001 | Bristow | |
| 6,312,137 B1 | 11/2001 | Hsieh | |
| 6,454,425 B1 | 9/2002 | Lin | |
| 6,461,011 B1 | 10/2002 | Harrison | |
| 6,511,219 B2 | 1/2003 | Sevelle | |
| D486,924 S | 2/2004 | Skradski et al. | |
| 6,688,752 B2 | 2/2004 | Moore | |
| 6,712,493 B2 | 3/2004 | Tell et al. | |
| 6,757,487 B2 | 6/2004 | Martin et al. | |
| 6,781,270 B2 | 8/2004 | Long | |
| 6,953,401 B2 | 10/2005 | Starr | |
| 6,955,440 B2 | 10/2005 | Niskanen | |
| 6,966,665 B2 | 11/2005 | Limburg et al. | |
| 7,029,146 B2 | 4/2006 | Kitchen | |
| 7,080,472 B2 | 7/2006 | Schroeter et al. | |
| 7,083,315 B2 | 8/2006 | Hansler et al. | |
| 7,093,949 B2 | 8/2006 | Hart | |
| 7,111,421 B2 | 9/2006 | Corry et al. | |
| 7,118,243 B2 | 10/2006 | McCavit et al. | |
| 7,125,142 B2 | 10/2006 | Wainwright | |
| 7,159,994 B2 | 1/2007 | Schnuckle | |
| D545,458 S | 6/2007 | Jensen | |
| 7,261,455 B2 * | 8/2007 | Schnuckle | B44C 5/06 362/161 |
| 7,300,179 B1 | 11/2007 | LaDuke et al. | |
| 7,305,783 B2 | 12/2007 | Mix et al. | |
| D567,993 S | 4/2008 | Shiu | |
| 7,360,935 B2 | 4/2008 | Jensen et al. | |
| D576,317 S | 9/2008 | Jensen | |
| D589,176 S | 3/2009 | Huang et al. | |
| D599,491 S | 9/2009 | Luo | |
| 7,633,232 B2 | 12/2009 | Wong | |
| 7,686,471 B2 | 3/2010 | Reichow | |
| 7,824,627 B2 | 11/2010 | Michaels et al. | |
| 7,828,462 B2 | 11/2010 | Jensen et al. | |
| 7,837,355 B2 † | 11/2010 | Schnuckle | |
| 8,070,319 B2 | 12/2011 | Schnuckle et al. | |
| 8,081,872 B2 | 12/2011 | Wang | |
| 8,132,936 B2 | 3/2012 | Patton et al. | |
| 8,235,558 B1 | 8/2012 | Lauer | |
| 8,534,869 B2 | 9/2013 | Patton et al. | |
| 8,696,166 B2 | 4/2014 | Patton et al. | |
| 8,789,986 B2 * | 7/2014 | Li | F21S 6/001 362/393 |
| 8,894,261 B2 | 11/2014 | Chen | |
| 8,926,137 B2 * | 1/2015 | Li | F21S 6/001 362/202 |
| 9,052,078 B2 | 6/2015 | Sheng | |
| 2001/0033488 A1 | 10/2001 | Chliwnyj et al. | |
| 2002/0080601 A1 | 6/2002 | Meltzer | |
| 2003/0041491 A1 | 3/2003 | Mix | |
| 2003/0053305 A1 | 3/2003 | Lin | |
| 2003/0072154 A1 | 4/2003 | Moore | |
| 2004/0114351 A1 | 6/2004 | Stokes et al. | |
| 2004/0165374 A1 | 8/2004 | Robinson | |
| 2004/0223326 A1 | 11/2004 | Wainwright | |
| 2005/0007779 A1 | 1/2005 | Nozawa et al. | |
| 2005/0097792 A1 | 5/2005 | Naden | |
| 2005/0169812 A1 | 8/2005 | Helf et al. | |
| 2005/0196716 A1 | 9/2005 | Haab et al. | |
| 2005/0285538 A1 | 12/2005 | Jaworski et al. | |
| 2006/0034079 A1 * | 2/2006 | Schnuckle | B44C 5/06 362/253 |
| 2006/0034100 A1 | 2/2006 | Schnuckle et al. | |
| 2006/0101681 A1 | 5/2006 | Hess et al. | |
| 2006/0120080 A1 | 6/2006 | Sipinski et al. | |
| 2006/0146544 A1 † | 7/2006 | Leung | |
| 2007/0002560 A1 | 1/2007 | Gutstein et al. | |
| 2007/0127249 A1 | 6/2007 | Medley et al. | |
| 2007/0154857 A1 | 7/2007 | Cho | |
| 2007/0159422 A1 | 7/2007 | Blandino et al. | |
| 2007/0236947 A1 | 10/2007 | Jensen et al. | |
| 2008/0074875 A1 | 3/2008 | Jensen et al. | |
| 2008/0112154 A1 | 5/2008 | Reichow | |
| 2008/0129226 A1 | 6/2008 | DeWitt et al. | |
| 2008/0130266 A1 | 6/2008 | DeWitt et al. | |
| 2009/0059596 A1 | 3/2009 | Lederer | |
| 2009/0135586 A1 | 5/2009 | Yang | |
| 2010/0079999 A1 | 4/2010 | Schnuckle | |
| 2010/0134022 A1 | 6/2010 | Gutstein et al. | |
| 2011/0019422 A1 * | 1/2011 | Schnuckle | F21S 10/04 362/277 |
| 2011/0110073 A1 * | 5/2011 | Schnuckle | F21S 10/04 362/96 |
| 2011/0127914 A1 | 6/2011 | Patton et al. | |
| 2011/0204828 A1 | 8/2011 | Moody et al. | |
| 2011/0317403 A1 | 12/2011 | Fournier et al. | |
| 2012/0134157 A1 | 5/2012 | Li | |
| 2013/0050985 A1 * | 2/2013 | Kwok | F21S 6/001 362/96 |
| 2013/0163249 A1 | 6/2013 | Miura | |
| 2014/0211499 A1 | 7/2014 | Fong et al. | |
| 2014/0254148 A1 | 9/2014 | Fournier | |
| 2014/0268704 A1 | 9/2014 | Yang | |
| 2014/0313694 A1 | 10/2014 | Patton et al. | |
| 2014/0362592 A1 * | 12/2014 | Lee | F21S 10/046 362/386 |
| 2015/0036348 A1 | 2/2015 | Dong | |
| 2015/0124442 A1 | 5/2015 | Ding | |
| 2015/0233538 A1 | 8/2015 | Sheng | |

(56) References Cited

U.S. PATENT DOCUMENTS

| | | | |
|---|---|---|---|
| 2015/0308643 A1 | | 10/2015 | Huang |
| 2016/0040844 A1 | | 2/2016 | Patton et al. |

FOREIGN PATENT DOCUMENTS

| | | | |
|---|---|---|---|
| CN | 2562059 | | 7/2003 |
| CN | 1530141 | A | 9/2004 |
| CN | 1530142 | A * | 9/2004 |
| CN | 1646177 | A | 7/2005 |
| CN | 2854329 | Y | 1/2007 |
| CN | 2888274 | Y | 4/2007 |
| CN | 200940808 | Y | 8/2007 |
| CN | 201011621 | Y | 1/2008 |
| CN | 201059432 | Y | 5/2008 |
| CN | 201103952 | | 8/2008 |
| CN | 201159425 | | 12/2008 |
| CN | 101408284 | A | 4/2009 |
| CN | 201235095 | Y | 5/2009 |
| CN | 201418887 | Y | 3/2010 |
| CN | 201533921 | U | 7/2010 |
| CN | 101865413 | | 10/2010 |
| CN | 201643048 | U | 11/2010 |
| CN | 102147095 | A | 8/2011 |
| CN | 102748589 | | 10/2012 |
| CN | 203273670 | U | 11/2013 |
| CN | 203442498 | U | 2/2014 |
| CN | 203517611 | U | 4/2014 |
| CN | 203571618 | U | 4/2014 |
| DE | 1489617 | A1 | 5/1969 |
| DE | 102012206988 | A1 | 10/2013 |
| EP | 0138786 | A1 | 4/1985 |
| EP | 0855189 | A2 | 7/1998 |
| EP | 1838110 | A1 | 9/2007 |
| EP | 2587127 | A1 | 5/2013 |
| GB | 2323159 | | 9/1998 |
| GB | 2379731 | | 3/2003 |
| GB | 2385413 | A | 8/2003 |
| GB | 2455598 | A | 6/2009 |
| JP | H0652709 | | 2/1994 |
| JP | H1057464 | A | 3/1998 |
| JP | 2000284730 | A | 10/2000 |
| JP | 2008180755 | A | 8/2008 |
| WO | WO-8202756 | A1 | 8/1982 |
| WO | WO-8503561 | A1 | 8/1985 |
| WO | WO-8704506 | A1 | 7/1987 |
| WO | WO-9625624 | A1 | 8/1996 |
| WO | WO-0192780 | | 12/2001 |
| WO | WO-03011349 | | 2/2003 |
| WO | 2006020839 | | 2/2006 |
| WO | WO-2008092753 | A2 | 8/2008 |
| WO | WO-2012000418 | A1 | 1/2012 |
| WO | WO-2013020263 | A2 | 2/2013 |

OTHER PUBLICATIONS

International Search Report and Written Opinion for related PCT Application No. PCT/CN2014/073557 mailed Jul. 2, 2014 (11 pages).
U.S. Appl. No. 61/101,611 to Schnuckle.
U.S. Appl. No. 61/293,516 to Patton.
International Search Report and Written Opinion for PCT Application No. PCT/CN/2014/073557 mailed Jul. 2, 2014.
International Search Report for PCT Application No. PCT/US2009/054401 mailed Oct. 26, 2009.
EP Search Report for European Patent Application No. 12185984.7 mailed Dec. 14, 2012.
Engineer's Handbook (Epoxy definition), http://engineershandbook.com/Materials/epoxy.htm, Jul. 18, 2013.
Nagashima, H. et al., "Introduction to Chaos, Physics and Mathematics of Chaotic Phenomena," Institute of Physics Publishing, 1999.
Definition of "Electromagnet" in the Encarta World English Dictionary, Aug. 1999.
Lab M3: The Physical Pendulum, Physics 1140—Experimental Physics, Course Laboratory Instructions, 2000.

\* cited by examiner
† cited by third party

ELECTRONIC LIGHTING DEVICE AND METHOD FOR MANUFACTURING SAME

CROSS REFERENCE TO RELATED APPLICATIONS

The present application is a continuation of U.S. patent application Ser. No. 14/161,143, filed Jan. 22, 2014, now U.S. Pat. No. 8,926,137, entitled "Electronic Lighting Device and Method for Manufacturing Same," which is a continuation of U.S. patent application Ser. No. 13/325,754, filed Dec. 14, 2011, now U.S. Pat. No. 8,789,986, entitled "Electronic Lighing Device and Method for Manufacturing Same," which is a continuation-in-part of International PCT Patent Application No. PCT/CN2011/076449, filed Jun. 27, 2011, which claims priority to Chinese Patent Application No. 201010211402.8, filed Jun. 28, 2010, each of which is hereby incorporated by reference in its entirety.

TECHNICAL FIELD

The present application relates to an electronic lighting device.

BACKGROUND

In our daily life, various electronic lighting devices are widely applied to toys, home decoration products and gifts. For instance, candles, kerosene lamps and so on are originally used as lamps for illumination. However, people are no longer concerned about the illumination function of candles and kerosene lamps as electrical light sources are used commonly. The candles and kerosene lamps are thus used for interestedness or appreciation rather than illumination. Recently, various electronic lighting devices, such as electronic flashing candles, electronic candles, simulated candles and simulated kerosene lamps and the like, emerge as required. Lighting parts of such electronic lighting devices try to simulate lighting patterns of candles or kerosene lamps, namely, to simulate flashing and flickering flames of candles or kerosene lamps. However, compared with the flames of candles or kerosene lamps, the lighting parts of the electronic lighting devices are quite different and have not enough realistic visual effect.

For instance, a type of electronic candle is disclosed in a Chinese application No. 200520035772.5, titled "Electronic Simulated Flashing Candle". The electronic candle comprises a flame shell shaped as true flames, LED elements disposed in the flame shell, and a control circuit. The control circuit controls lighting sequences of the LED elements such that the LED elements flash on and off. As a result, a visual experience of winkling and jumping light is given by the electronic candle and thus the interestedness or appreciation of the electronic candle is enhanced.

SUMMARY

An objective of the present application is to provide an electronic lighting device for simulating true fire and a method for manufacturing the same to simulate true fire with an enhanced visual experience.

According to an aspect of the present application, an electronic lighting device comprising a core is provided. The core may comprise: an enclosure provided with a through hole on a top thereof; a flame sheet movably supported or suspended on the enclosure, wherein the flame sheet comprises an upper sheet which is of a flame-like shape, and the upper sheet is configured to expose above the top of the enclosure through the through hole of the enclosure; a light-emitting element installed on a sidewall of the enclosure such that an outgoing direction of a light from the light-emitting element is inclined upward and passing through the through hole of the enclosure, wherein the outgoing direction is intersected with a surface of the upper sheet, so that the light from the light-emitting element is projected on the surface of the upper sheet; and a swing mechanism disposed beneath the flame sheet, wherein the swing mechanism is configured to apply a force on the flame sheet to actuate the flame sheet to sway or swing.

According to another aspect of the present application, a method for manufacturing an electronic lighting device is provided. The method may comprises: suspending a flame sheet on an enclosure, wherein the flame sheet comprises a upper sheet which is of a flame-like shape and exposed above a top of the enclosure; installing a light-emitting element on a sidewall of the enclosure such that an outgoing direction of a light from the light-emitting element is inclined upward and passing through a through hole of the enclosure to be intersected with a surface of the upper sheet, so that the light from the light-emitting element is projected on the surface of the upper sheet; and disposing a swing mechanism beneath the flame sheet, wherein the swing mechanism is configured to apply a force on the flame sheet to actuate the flame sheet to sway or swing.

In the present application, by the cooperation of the flame sheet with the light projected thereon, the flame sheet may sway or swing under the action of its own gravity and the swing mechanism. The light given off by the light-emitting element is projected on the flame sheet and looks like a true flickering flame so that the flame simulated by the lighting device is closer to the wick flame of the traditional lighting device such as a candle, a kerosene lamp and the like. In the case where the device according to the present application is applied to electronic products, such as electronic candles or simulated kerosene lamps and the like, it further improves the visual experience of the electronic products and provides the electronic products with enhanced interestedness and appreciation.

In some embodiments, since the swing mechanism in the device of the present application uses a magnetic mechanism, the flame sheet maintains to sway randomly or disorderly in use, so that the light projected on the flame sheet keeps flickering and looks like a true flame.

In some embodiments, in the device of the present application, the light given off by the light-emitting element has an emission angle within a specific range, so that the light is assured to be projected on the flame sheet, and thus the visual effect of simulating true fire is assured.

In some embodiments, the shell is simulated in to a traditional candle in shape, so that the device of the present application is closer to the traditional candle in visual effect.

DETAILED DESCRIPTION

Hereinafter, a detailed description of the present application will be given by specific embodiments and with reference to the appended drawings.

Embodiment 1

Figure 1:
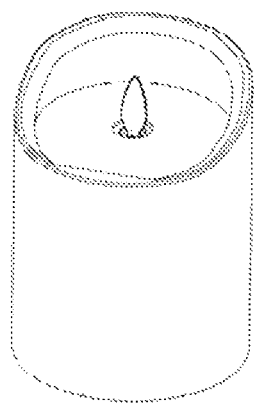
FIG. 1 is a schematic view showing an appearance of an electronic candle according to a first embodiment of the present application.
Figure 2:
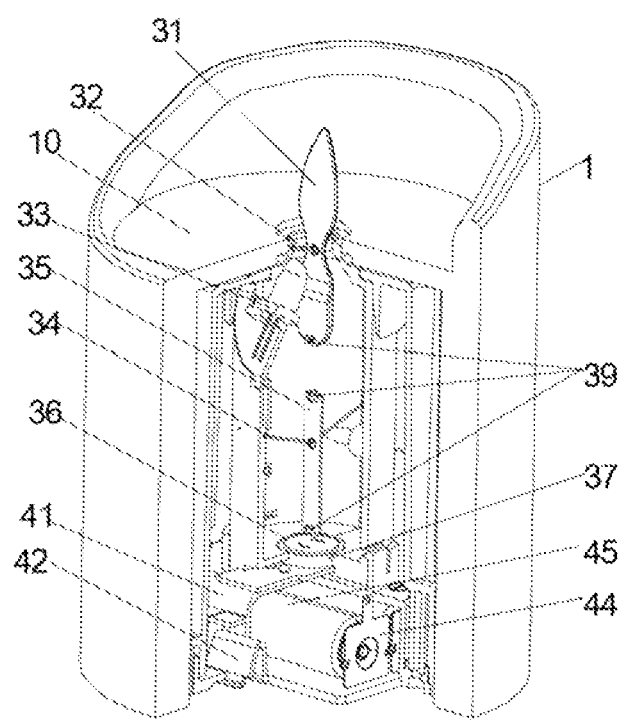
FIG. 2 is a cross-sectional view showing a structure of the electronic candle according to the first embodiment of the present application.

In particular, the present application provides an electronic candle, with reference to FIGS. 1 to 5. FIG. 1 is a schematic view showing the appearance of the electronic candle according to the first embodiment. The electronic candle, which is shaped as a true candle, comprises: a shell 1, a casing 2 sleeved within the shell 1, a core 3 and a base 4 installed within the casing 2. The casing 2 is provided with a through hole at the top-center. A flame sheet is arranged in the through hole. A portion of the flame sheet which protrudes outsides through the through hole is shaped as a flame of a burning candle. The light emitted from a light-emitting element which is disposed on the core 3 is projected, at an angle, onto the portion of the flame sheet which protrudes outsides through the through hole. Further, the flame sheet may sway freely under the action of natural winds or a swing mechanism arranged within the core 3. In this way, the flame simulated by the electronic candle, when viewed from a distance, flickers like that of a true candle, as if it is a perfectly realistic flame, and thus can be scarcely distinguished from the true one.

As shown in FIGS. 2 to 5, the core 3 comprises an enclosure, a flame sheet 31, a LED light 33 and a swing mechanism. The enclosure comprises left and right caps 38 and 38' having symmetrical shapes with each other. A cylindrical cavity is formed when the left and right caps 38 and 38' are arranged to engage with each other. Each of the left and right caps 38 and 38' has a semicircular notch on the top, such that a circular opening 380 is formed on the top of the cavity by the semicircular notches when the left and right caps 38 and 38' are arranged to engage with each other. The left and right caps 38 and 38' have respective left and right notches 381 and 381' on the upper portions of their sidewalls. The left and right notches 381 and 381' are concaved inwardly and inclined at a certain angle with respect to the sidewalls in such a way that an installation location for the LED light, which inclines toward and communicates with the opening 380, is formed by the left and right notches 381 and 381' when the left and right caps 38 and 38' are arranged to engage with each other. The LED light 33 is then installed at this installation location such that an angle between a longitudinal central axis of the LED light 33 and that of the cavity is about 35 degree. Moreover, the LED light 33 may be a LED element emitting concentrated light with a relatively narrow emission angle (7-10 degree). Further, combined with an appropriate area of an upper sheet 311 of the flame sheet 31, it can be assured that light emitted from the LED light 33 is maintained to be projected onto the surface of the flame sheet 31. As a result, light beams are increased in brightness and form an elliptical light spot on the surface of the flame sheet 31, so that the flame sheet 31 looks more like a flame of a true candle in shape.

Figure 6:
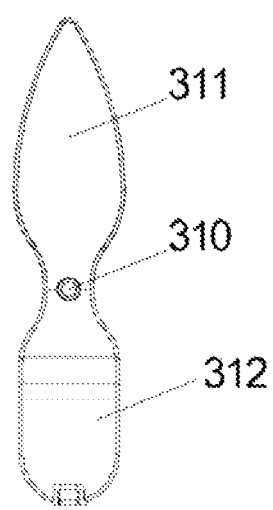
FIG. 6 is a schematic view showing a structure of a flame sheet of the electronic candle according to the first embodiment of the present application.

With reference to FIG. 6, the flame sheet 31 is of sheet type, and provided with a through hole 310 at the middle part. The flame sheet 31 is divided, by the through hole 310, into a upper sheet 311 shaped as a flame of a burning candle and a lower sheet 312. The lower sheet 312 has a counterweight slightly heavier than that of the upper sheet 311, so that the flame sheet 31 is vertically suspended in a free state (under the action of its own gravity without any external force). A supporting rod 32 passes through the through hole 310 and spans across the opening 380 of the core's cavity. The supporting rod 32 is V-shaped and depressed slightly at the middle so that the flame sheet 31 is suspended steadily at the lowest point of the supporting rod 32 since the lower sheet 312 has a counterweight slightly heavier than that of the upper sheet 311. It is easier for the flame sheet suspended vertically in a free state (under the action of its own gravity without any external force) to sway randomly under the action of an external force. In this way, the supporting rod 32 spanning across the opening 380 of the core's cavity may enable the flame sheet 31 to sway randomly under the action of an external force, such as natural winds. However, the supporting rod 32 may maintain a relatively fixed position relationship between the upper sheet 311 of the flame sheet 31 and the light outgoing direction of the LED light 33 such that the light from the LED light 33 can be projected onto the surface of the upper sheet 311 of the flame sheet 31. Since the flame sheet 31 is manufactured by a semitransparent material, a portion of the light can emerge from the back of the flame sheet 31 when the light is projected onto the flame sheet 31. In order to improve the effect of simulating a true candle's flame, a wire is embedded in the flame sheet 31 at the bottom of the upper sheet 311 to simulate a candlewick. In the case where the wire is irradiated by the light of the LED light 33 projected on the upper sheet 311, as if there is a candlewick within a flame, such that the flame sheet 31 is more like the flame of a true burning candle in visual effect. In addition, since the supporting rod 32 is irradiated by the LED light 33, a shadow of the supporting rod 32 is formed on the surface of the upper sheet of the flame sheet 31 and may also look like the candlewick.

The tubular shell 1 is manufactured by a transparent or semitransparent material, such as PVC. The shell 1 comprises a tubular sidewall and a diaphragm plate 10 intersected with the tubular sidewall. A through hole is provided at the middle of the diaphragm plate 10, from which the upper sheet 311 of the flame sheet 31 protrudes outsides. In order to simulate irregular wax melting when a candle is burning, a portion of the shell's sidewall above the diaphragm plate 10 is formed to have an irregular end face. For example, the sidewall may be lower in front and higher behind. The surfaces of the shell's sidewall and the diaphragm plate 10 are coated with candle wax, such that the electronic candle looks more like a true candle. The upper sheet 311 of the flame sheet 31 protrudes outsides through the through hole of the diaphragm plate 10, with its front surface (the surface projected by the light) facing a lower point of the sidewall and its back surface obscured by a higher sidewall of the shell. In this way, a user is guided to dispose the electronic candle at a preferable angle to appreciate the "candle light", that is to say, the electronic candle is viewed from the front surface of the upper sheet 311 of the flame sheet 31 and from the lower point of the sidewall. Accordingly, the effect for simulating a true candle by the electronic candle according to the first embodiment can be improved.

Figure 4:
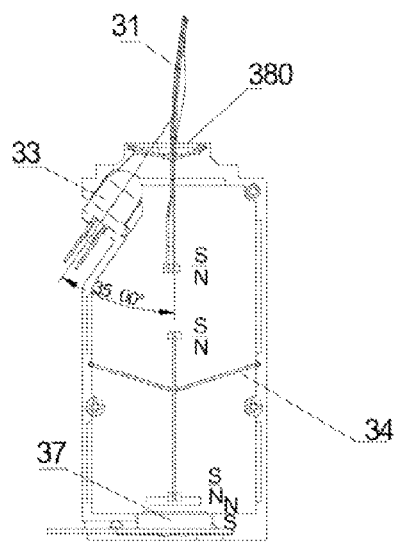
FIG. 4 is a schematic view showing a structure of a core of the electronic candle according to the first embodiment of the present application.
Figure 5:
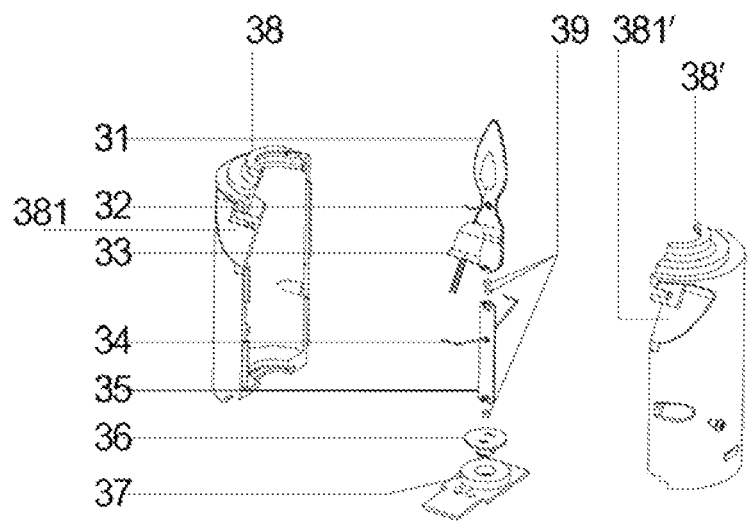
FIG. 5 is an exposed view schematically showing the structure of the core of the electronic candle according to the first embodiment of the present application.

In order to assure the effect of swaying of the flame sheet, the core is provided with a swing mechanism which maintains to act on the flame sheet directly or indirectly with a force such that the flame sheet maintains to sway or swing. As shown in FIGS. 4 and 5, the swing mechanism in the embodiment uses a magnetic mechanism comprising a set of magnets 39, a linkage sheet 35, a linkage rod 34 and a coil 37. The set of magnets 39 comprises a first magnet, a second magnet and a third magnet. The linkage rod 34 is movably threaded through the linkage sheet 35, and arranged to span across the core's cavity. The linkage rod 34 is V-shaped, and depressed slightly at the middle so that the linkage sheet 35 is positioned at the lowest point at the middle of the linkage rod 34. The linkage sheet 35 may be suspended freely in the core's cavity without any external force. The second and third magnets are adhered to or embedded into the upper and lower ends of the linkage sheet 35, respectively. The first magnet is adhered to or embedded into the lower end of the flame sheet 31. A magnetic pole of the first magnet facing the second magnet has a polarity opposite or same to that of a magnetic pole of the second magnet at the upper end of the linkage sheet 35 facing the first magnet, that is to say, they may attract or repel each other. The coil 37 is fastened onto a PCB subboard through a snap ring 36, and disposed beneath the lower end of the linkage sheet 35 so as to be opposite to the third magnet at the lower end of the linkage sheet 35.

The operation principle on the swaying or swinging of the flame sheet 31 is illustrated below. Firstly, an oscillation is output through a control circuit. When powered on, the coil 37 then produces a magnetic field which is opposite to the polarity of the magnet pole of the third magnet at the lower end of the linkage sheet 35 facing the coil so that the coil 37 and the third magnet at the lower end of the linkage sheet 35 repel each other. As a result, the linkage sheet 35 sways toward one side. Moreover, since the second magnet at the upper end of the linkage sheet 35 and the first magnet at the lower end of the flame sheet 31 attract or repel each other, the flame sheet 31 sways. When the coil 37 is powered off, the flame sheet 31 freely falls down under the action of its own gravity, and continues to sway in an opposite direction under an inertia potential energy until the coil 37 is powered on again. Then the inertial motion of the flame sheet 31 is changed by the magnetic force of the coil 37 via the linkage sheet 35, and a next sway cycle begins.

Figure 3:
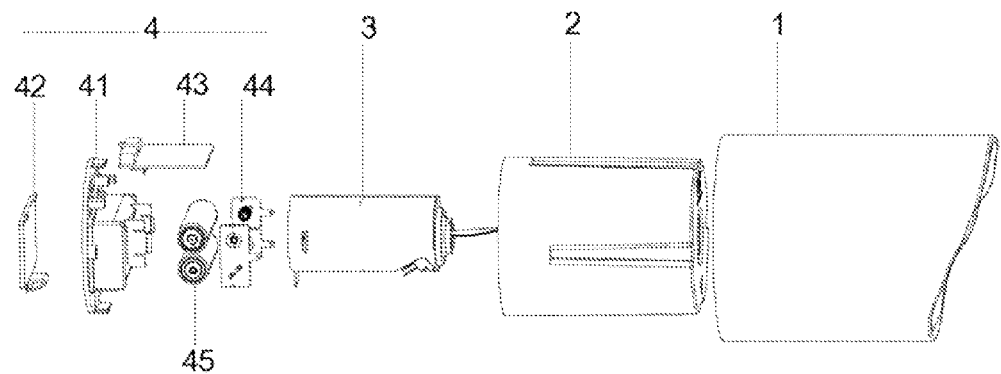
FIG. 3 is an exposed view schematically showing the structure of the electronic candle according to the first embodiment of the present application.

As shown in FIGS. 3 and 4, the base 4 comprises a battery tray 41, a battery cover 42, a PCB mainboard 43 and pieces of battery shrapnel 44. The pieces of battery shrapnel 44 are installed on the battery tray 41 to form a battery chamber for accommodating batteries 45. The PCB mainboard 43 is installed on the battery tray 41 and arranged at one side of the battery chamber. The control circuit and a power switch are arranged on the PCB mainboard 43. The PCB mainboard 43 is electrically connected, via wires, with the LED light 33, the PCB subboard installed with the coil 37, and the pieces of batter shrapnel. The battery cover 42 is arranged at the bottom of the battery tray 41 and can be removed to enable the displacement of the batteries in the battery chamber. The core 3 is installed on the base 4, wherein the PCB subboard installed with the coil 37 is electrically connected with the PCB mainboard 43. The circumference of the battery stray 41 and the bottom of the casing 2 may be snapped together, or may be threaded with each other through a bolt. The casing 2 is a hollow cylinder, the external diameter of which is equal to or slightly larger than the internal diameter of the shell 1 so as to be tightly fitted into the shell 1. The casing 2 is provided with a through hole on the top, which is used for mating with the core 3. When the core 3 is received within the casing 2, the upper sheet 311 of the flame sheet 31 is exposed out of the casing 2 through the casing's through hole.

Figure 7:
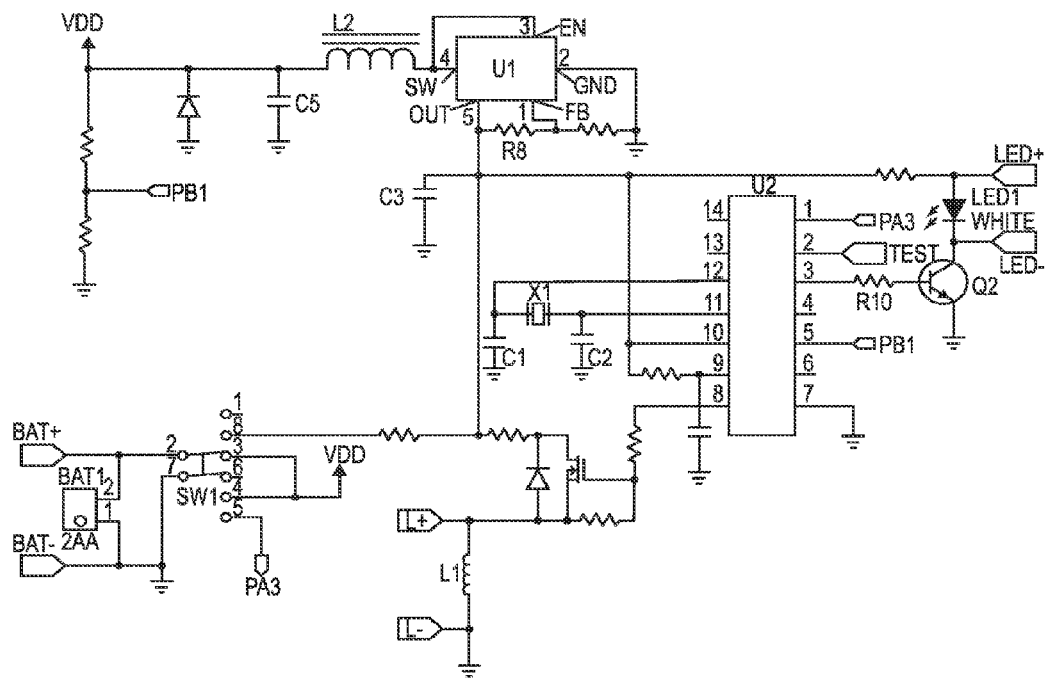
FIG. 7 is a schematic diagram showing a circuit part of the electronic candle according to the first embodiment of the present application.

FIG. 7 is a circuit schematic diagram of the embodiment. The operation principle of the electronic candle according to the embodiment is illustrated below with reference to FIG. 7.

In the power source part, the energy provided by the batteries is transferred, via a switch SW1, to an input pin of a boost converter U1, then into a boost circuit consisting of components such as a fifth capacitor C5, a second inductor L2, the boost converter U1, a third capacitor C3 and an eighth resistor R8. A stable voltage of 3.3V is then output from a fifth pin of the boost converter U1 to be supplied to a microprocessor U2, a LED light LED1 (expressed as the LED light 33 in the structure described above, using a warm white light similar to true fire in color) and a coil L1.

In the case where the switch SW1 is closed such that the circuit is powered by the power source part, the microprocessor U2 starts to work upon receiving a 3.3-volt voltage. When a voltage at a fifth pin (PB1) of the microprocessor U2 is above 1.82-volt, the microprocessor U2 controls an eighth pin (PWM/PCO) to output a square wave pulse of 40 ms on and 630 off. A MOS transistor Q1 and the coil L1 are controlled through the square wave pulse to oscillate so as to produce a magnetic field. In the case that the magnetic field produced by the magnet at the lower end of the linkage sheet 35 is the same as that produced by the coil (both are N poles or S poles), the coil repels the magnet. The magnet then brings the linkage sheet 35 to sway toward left or right. Further, in the case that the magnetic field produced by the magnet at the upper end of the linkage sheet 35 is opposite to that produced by the magnet at the lower end of the flame sheet 31, the linkage 35 drives the flame sheet 31 to sway toward right or left since the linkage sheet 35 and the flame sheet 31 are arranged to be a distance from each other. Meanwhile, the microprocessor U2 controls a third pin (PB3) to output a high level so as to supply about a 0.6-volt voltage to the base of a triode Q2 via a resistor R10. Once the triode Q2 is turned on, the LED light LED1 is lighted. Then the light is projected onto the flame sheet at an angle of 35 degree. Under the action of the coil, the flame sheet, as viewed from a distance, is very similar to that of a burning candle. The optimum viewing distance is farther than 1 m from the electronic candle, the viewing angle being smaller than 120 degree.

The work of circuit in the case where the switch is switched such that the circuit is controlled by a timer and a first pin (PA3) of the microprocessor U2 is at a low level is illustrated below. On one hand, the microprocessor U2 controls the eighth pin (PWM/PCO) to output a square wave pulse of 40 ms on and 630 ms off after halting for 500 ms. The MOS transistor Q1 and the coil are controlled through the square wave pulse to oscillate so as to produce a magnetic field. In the case that the magnetic field produced by the magnet at the lower end of the linkage sheet 35 is the same as that produced by the coil (both are N poles or S poles), the coil repels the magnet. The magnet then brings the linkage sheet 35 to sway toward left or right. Further, in the case that the magnet at the upper end of the linkage sheet 35 produce a magnetic field which is opposite to that produced by the magnet at the lower end of the flame sheet 31, the linkage sheet 35 drives the flame sheet 31 to sway toward right or left since the linkage sheet 35 and the flame sheet 31 are arranged to be a distance from each other. Meanwhile, the microprocessor U2 controls the third pin PB3 to output a high level after halting for 500 ms (that is to say, the LED light LED1 blinks for once) so as to apply about a 0.6-volt voltage to the base of the triode Q2 via the tenth resistor R10. Once the triode Q2 is turned on, the LED light LED1 is lighted. On the other hand, an oscillation circuit, which consists of a crystal oscillator X1, a first capacitor C1 and a second capacitor C2, provides standard clock information to the microprocessor U2. The timer of the microprocessor U2 starts timing upon the LED light LED1 blinks. After 5 hours, the microprocessor U2 will controls the eighth pin (PWM/PCO) and the third pin (PB3) to output a low level, so that the flame sheet stops swaying and the LED light LED1 goes out. After next 19 hours, the microprocessor U2 controls the eighth pin (PWM/PCO) to output a square wave of 40 ms on and 630 ms off, and the PB3 to output a high level, so that the flame sheet starts to sway and the LED light LED1 is lighted. In view of the above, the total time of a cycle is 24 hours. The circuit can circularly work in this way, until the batteries exhaust or the switch is switched into other states.

When the battery voltage is below 1.62 volt, the LED light will go out no matter that the switch is switched such that the circuit is powered by the power source part or controlled by a timer. Meanwhile, the flame sheet stops swaying, and the control circuit goes to a sleep state. The circuit restores to work until the batteries are replaced with new ones.

When the switch is opened, the boost converter U1 and the microprocessor U2 stop working since they are not powered by the batteries. As a result, the LED light will go out, meanwhile, the flame sheet 31 stops swaying.

Embodiment 2

Figure 8:
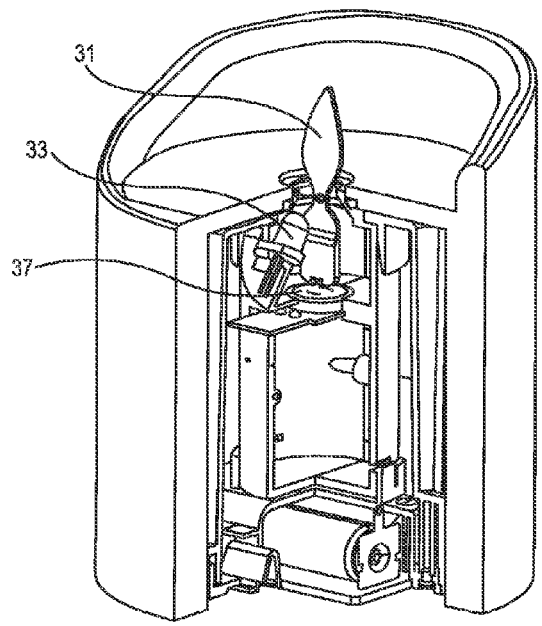
FIG. 8 is a cross-sectional view showing a structure of an electronic candle according to a second embodiment of the present application.

With reference to FIG. 8, the swing mechanism according to the first embodiment is simplified according to the second embodiment. The linkage sheet 35 and components attached thereto, such as the linkage sheet 34 and two magnets at both ends thereof, are omitted. Thus, the coil 37 is disposed adjacent to the lower end of the flame sheet 31. In the case that the coil 37 produces a magnetic field which is opposite to that produced by the magnet at the lower end of the flame sheet 31, the coil 37 and the flame sheet 31 repel each other so as to keep the flame sheet 31 swaying.

Embodiment 3

Figure 9:
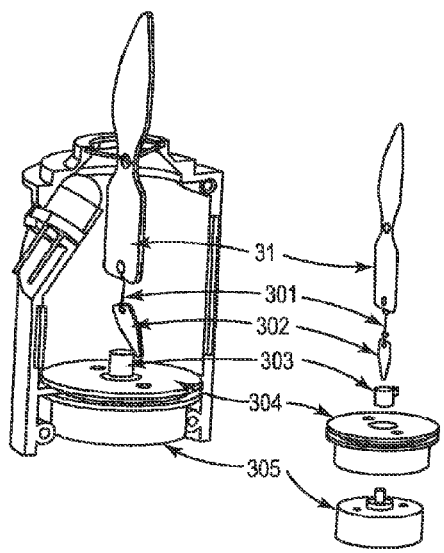
FIG. 9 is an exposed view schematically showing a structure of a core of an electronic candle according to a third embodiment of the present application.

In this embodiment, the swing mechanism in the core 3 according to the first embodiment is replaced with a swing mechanism according to the third embodiment. With reference to FIG. 9, the swing mechanism according to the third embodiment comprises a hanging rope 301, a swing piece 302, a rotary block 303, a motor fixed block 304 and a motor 305. The upper end of the hanging rope 301 is hanged to the lower end of the flame sheet 31, and the lower end of the hanging rope 301 is connected with the swing piece 302. The motor 305 is fixed within the core's enclosure by the motor fixed block 304. The rotary block 303 is fixed to the output shaft of the motor 305. In a natural state (under the action of gravity, without the action of any external force), the swing piece 302 is, depending on its own gravity, hanged to the hanging rope 301 and then the lower end of the swing piece 302 contacts with the rotary block 303. When the motor 305 is actuated, the rotary block 303 collides with the swing piece 302 continually. As a result, the swing piece 302 sways continually, which makes the flame sheet 31 sway disorderly.

Figure 10:
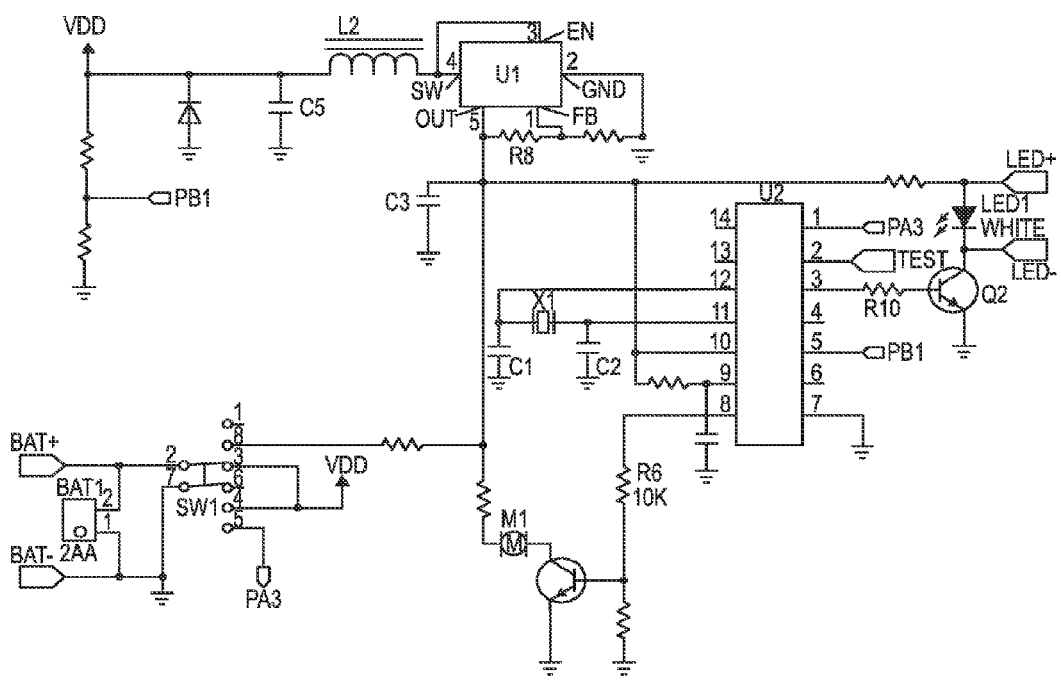
FIG. 10 is a schematic diagram of a circuit part of the electronic candle according to the third embodiment of the present application.

With reference to FIG. 10, a circuit schematic diagram according to the embodiment is shown. The operation of the swing mechanism is performed through controlling the rotation of the motor M1 with the eighth pin of the microprocessor U2.

Embodiment 4

Figure 11:
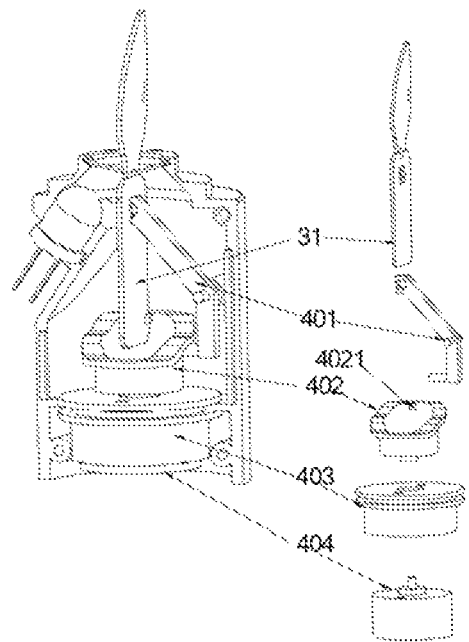
FIG. 11 is an exposed view schematically showing a structure of a core of an electronic candle according to a fourth embodiment of the present application.
Figure 12:
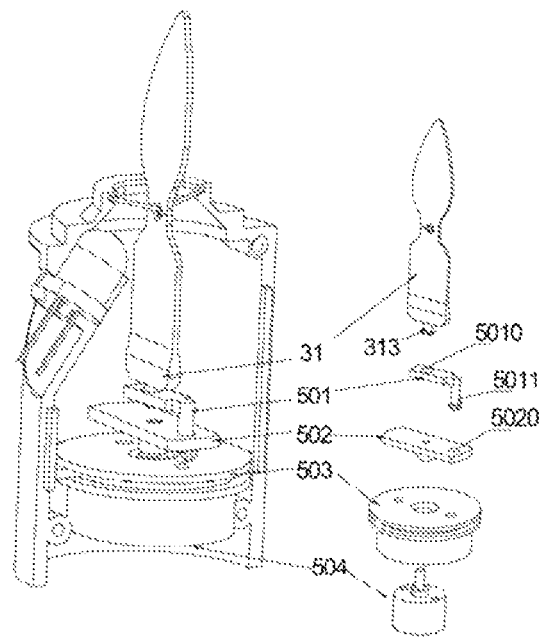
FIG. 12 is an exposed view schematically showing a structure of a core of an electronic candle according to a fifth embodiment of the present application.

In the fourth embodiment, the swing mechanism in the core 3 according to the first embodiment is replaced with a swing mechanism described below. With reference to FIG. 11, the swing mechanism according to the forth embodiment comprises a linkage rod 401, a rotary block 402, a motor fixed block 403 and a motor 404. The middle part of the flame sheet 31 is provided with a slot, in which the upper end of the linkage rod 401 is stuck. The bottom end of the linkage rod 401 contacts with the outer wall of the rotary block 402. The rotary block 402 has an irregular height, and is provide with a pan-like cavity at the middle part. Moreover, the sidewall of the pan-like cavity is provided with a tab 4021. The lower end of the flame sheet 31 is stretched into the pan-like cavity. In a natural state, the tab 4021 contacts with the lower end of the flame sheet 31. The motor 404 is fixed within the enclosure of the core by the motor fixed block 403. The rotary block 402 is fixedly connected to an output shaft of the motor 404. When the motor 404 is actuated and thus the rotary block 402 is forced to rotate, the outer wall of the rotary block 402 will continually collides with the bottom end of the linkage rod 401. As a result, the tab 4021 will continually (or intermittently) collides with the lower end of the flame sheet 31, which makes the flame sheet 31 sway or swing disorderly.

Embodiment 5

In the fifth embodiment, the swing mechanism in the core 3 according to the first embodiment is replaced with a swing mechanism described below. The swing mechanism according to the fifth embodiment comprises a connecting piece 501, a rotary block 502, a motor fixed block 503 and a motor 504. The lower end of the flame sheet 31 is provided with a snap-on piece 313, which can be snapped into a receiving piece 5010 of the connecting piece 501. The connecting piece 501 is L-shaped. An end of the connecting piece 501 far away from the receiving piece 5010 is provided with a snap-on piece 5011, which can be snapped into a receiving piece 5020 on the rotary block 502. The motor 504 is fixed within the enclosure of the core by the motor fixed block 503. The rotary block 502 is fixedly connected with an output shaft of the motor 504. When the motor 504 is actuated, the rotary block 502 brings the connecting piece 501 to rotate. The connecting piece 501 in turn brings the flame sheet 31 to sway.

Embodiment 6

Figure 13:
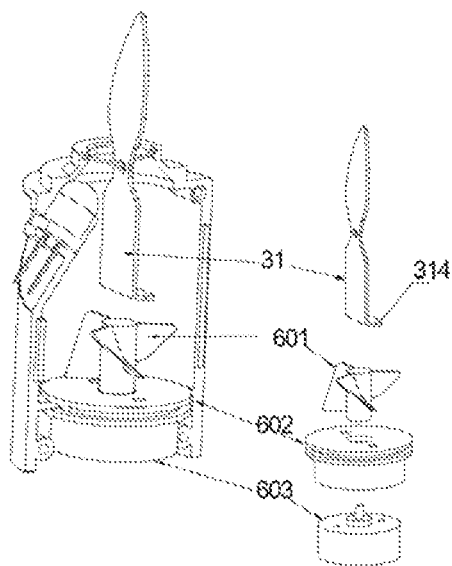
FIG. 13 is an exposed view schematically showing a structure of a core of an electronic candle according to a sixth embodiment of the present application.

In the sixth embodiment, the swing mechanism in the core 3 according to the first embodiment is replaced with a fan mechanism described below. With reference to FIG. 13, a fan is fixed within the enclosure of the core at the bottom of the cavity of the core. The fan comprises a wind wheel 601, a motor fixed block 602 and a motor 603. The air outlet direction of the wind wheel 601 is upward. The lower end of the flame sheet 31 is folded at an angle so as to form a baffle 314 which has a surface facing the air outlet direction of wind wheel 601. When the fan is activated, the surface of the baffle 314 of the flame sheet 31 is oriented to be upwind such that the flame sheet 31 continually sways under the action of the wind force.

Embodiment 7

Figure 14:
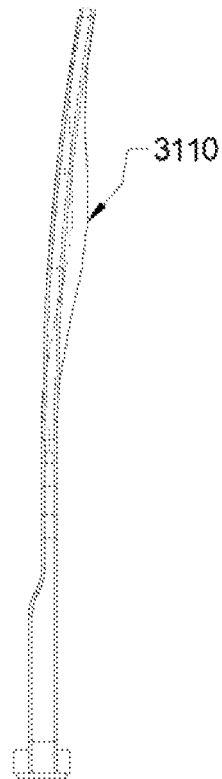
FIG. 14 is a schematic view showing a structure of a flame sheet of the electronic candle according to the seventh embodiment of the present application.

As shown in FIG. 14, the electronic candle according to the seventh embodiment is the same as that of the first embodiment, except for the upper sheet of the flame sheet. The upper sheet according to the seventh embodiment is slightly curved, which is concaved from one side. Flanks 3110 are provided at both sides of the concaved portion. The flanks 3110 and the concaved portion together form a depression onto which the light of the light-emitting element is projected. When the light of the light-emitting element is projected on the depression, a light spot is formed on the projected surface that is recessed with a certain depth rather than flat or curved. It seems that the depression is full of light. Further, when the flame sheet sways or swings disorderly, the light spot simulating a flame produces a stereovision effect.

In view of the above embodiments, all of the electronic candles can be powered by rechargeable batteries. In addition, a charge control circuit may be arranged on the PCB mainboard of the base, such that the electronic candle of the application is rechargeable using a Plug-and-socket charger or a charge seat.

The present application is further described in detail with reference to above specific embodiments, however, may be carried out by other embodiments than those set forth herein. Those skilled in the art will appreciate that all simple deduces or replacements can also be made without departing from the conception of the application, and are deemed to be embraced in the scope of the present application defined by the appended claims.

The invention claimed is:

1. An electronic lighting device comprising:
an enclosure provided with a through hole on an upper surface;
a flame component comprising a first portion shaped in appearance to substantially resemble the shape of a flame when viewed from at least one perspective, the flame component supported such that the first portion is exposed above the upper surface of the enclosure through the through hole of the enclosure; and
at least one light-emitting element contained entirely within an interior of the enclosure and positioned such that an outgoing direction of a light from the light-emitting element is projected from within the interior of the enclosure, through the through hole of the upper surface of the enclosure, and onto at least one surface of the first portion of the flame component, thereby illuminating the flame component from a light source external to the flame component;
wherein the enclosure comprises at least two enclosure elements operably configured to connect to form the enclosure having a cavity and the through hole and at least one of the enclosure elements comprises a cradle on its sidewall forming an installation location for one or more of the at least one light-emitting element, wherein the installation location is operably configured to allow the at least one light-emitting element to emit light at a direction towards the through hole.

2. The electronic lighting device of claim 1, wherein connecting of the at least two enclosure elements substantially secures one of the at least one light-emitting elements into the installation location.

3. The electronic lighting device of claim 1, wherein connecting of the at least two enclosure elements substantially secures the flame component such that the first portion is exposed above the upper surface of the enclosure.

4. The electronic lighting device of claim 1, further comprising an outer casing configured to operably connect to the enclosure, the outer casing comprising a through hole on a surface thereof which generally aligns with the through hole of the enclosure when the outer casing is operably connected with the enclosure.

5. The electronic lighting device of claim 1, further comprising an outer casing comprising a through hole, the outer casing securing the enclosure such that the first portion of the flame component extends through the through hole of the outer casing.

6. The electronic lighting device of claim 1, wherein at least one of the at least one light-emitting elements is an LED.

7. The electronic lighting device of claim 1, wherein the flame component comprises a through hole, extending from a first side of the flame component to another, and wherein the flame component is supported by a wire extending through the through hole of the flame component.

8. The electronic lighting device of claim 7, wherein at least one of the at least one light-emitting elements emits light from a first side of the wire at an angle toward the first portion of the flame component, which is positioned on an opposite side of the wire.

9. An electronic lighting device of claim 1, further comprising a magnet on a second portion of the flame component, the second portion opposite the first portion, and a coil positioned near the magnet of the flame component and energized by an electronic control circuit to produce a changing magnetic field interacting with the magnet of the flame component, thereby causing movement of the flame component.

10. An electronic candle comprising:
an enclosure provided with a through hole on an upper surface thereof;
a flame component comprising a first portion shaped in appearance to substantially resemble the shape of a flame when viewed from at least one perspective and being movably supported relative to the enclosure such that the first portion is exposed above the upper surface of the enclosure through the through hole of the enclosure;
an electrically-powered driving mechanism disposed adjacent the flame component and applying a force on the flame component to actuate the flame component to sway or swing; and
at least one light-emitting element contained entirely within an interior of the enclosure and positioned such that an outgoing direction of a light from the at least one light-emitting element is projected from within the interior of the enclosure, through the through hole of the upper surface of the enclosure, and onto at least one surface of the first portion of the flame component, thereby illuminating the flame component from the at least one light-emitting element operating as a light source external to the flame component;

wherein the enclosure comprises at least two enclosure elements operably configured to connect to form the enclosure having a cavity and the through hole;

wherein at least one of the enclosure elements comprises a cradle on its sidewall forming an installation location for one or more of the at least one light-emitting element;

wherein the installation location is operably configured to allow the at least one light-emitting element to emit light at a direction towards the through hole; and wherein the flame component comprises a magnet at an end opposite the first portion, and the electrically-powered driving mechanism comprises a coil positioned near the magnet of the flame component, energized by an electronic control circuit to produce a changing magnetic field interacting with the magnet of the flame component, thereby causing movement of the flame component.

11. The electronic candle of claim 10, wherein the electrically-powered driving mechanism comprises a rotating axis causing a mechanical force to be applied to the flame component, thereby causing movement of the flame component.

12. The electronic candle of claim 10, wherein the at least two enclosure elements being connected to each other substantially secures one of the at least one light-emitting elements into the installation location.

13. The electronic candle of claim 10, wherein the at least two enclosure elements being connected to each other substantially secures the flame component such that the first portion is exposed above the upper surface of the enclosure.

14. The electronic candle of claim 10, further comprising an outer casing configured to operably connect to the enclosure, the outer casing comprising a through hole on a surface thereof which generally aligns with the through hole of the enclosure when the outer casing is operably connected with the enclosure.

15. The electronic candle of claim 14, wherein the outer casing secures the enclosure such that the first portion of the flame component extends through the through hole of the outer casing.

* * * * *